A. P. KEZEMA.
VEHICLE TILTING DUMPING PLATFORM.
APPLICATION FILED JULY 28, 1920.
1,389,052.
Patented Aug. 30, 1921.
2 SHEETS—SHEET 2.
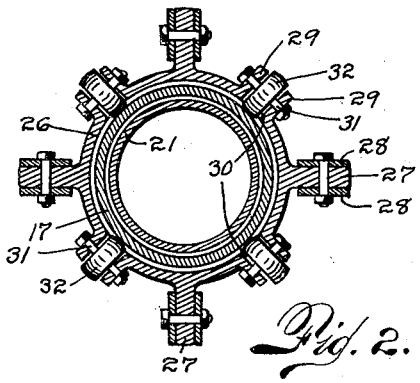
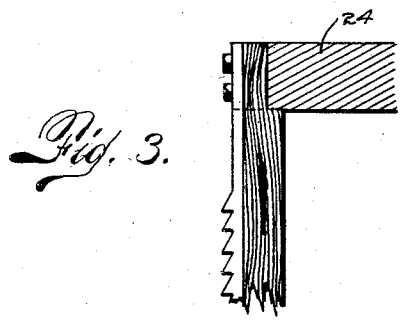
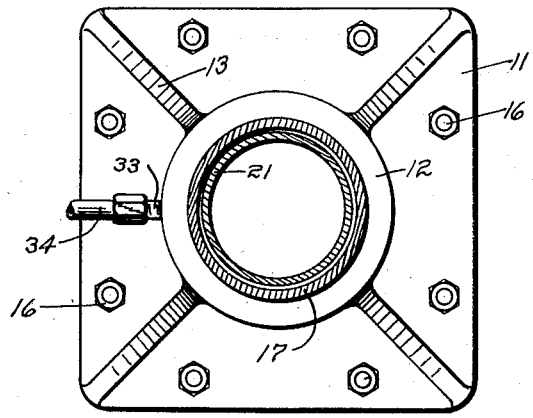
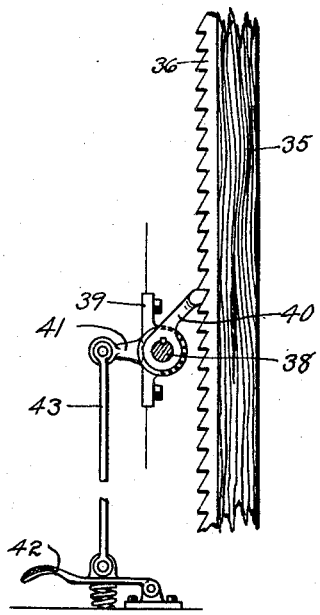
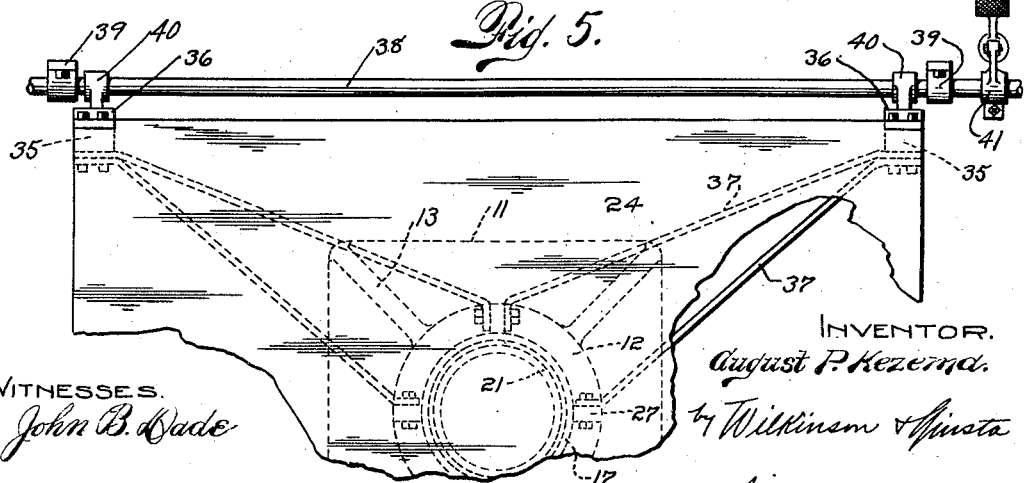
INVENTOR.
August P. Kezema.
by Wilkinson & Fisher
his ATTORNEYS.
WITNESSES.
John B. Dade

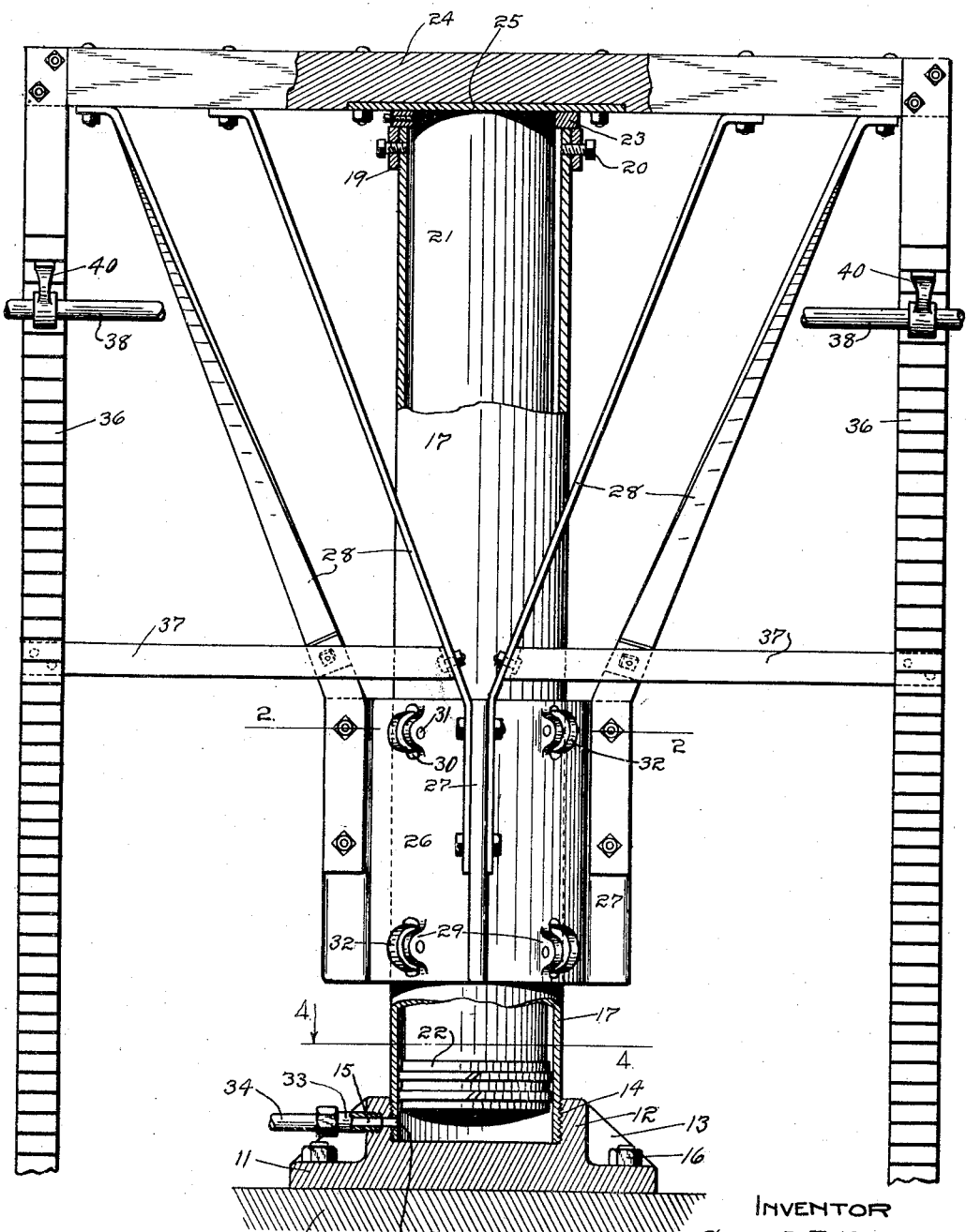

UNITED STATES PATENT OFFICE.

AUGUST P. KEZEMA, OF DENVER, COLORADO.

VEHICLE-TILTING DUMPING-PLATFORM.

1,389,052.   Specification of Letters Patent.   Patented Aug. 30, 1921.

Application filed July 28, 1920. Serial No. 399,604.

*To all whom it may concern:*

Be it known that I, AUGUST P. KEZEMA, a citizen of the United States, residing at the city and county of Denver and State of Colorado, have invented certain new and useful Improvements in Vehicle-Tilting Dumping-Platforms; and I do hereby declare the following to be a full, clear, and exact description of the invention, such as will enable others skilled in the art to which it appertains to make and use the same.

This invention relates to improvements in that type of platform dumps embodying a vertically actuated platform section which functions to elevate one end or side of a loaded vehicle, properly positioned thereon, and thereby tilt the vehicle sufficiently to dump its contents into a chute, bin or other receptacle associated with the stationary portion of the dump structure.

These dump structures have many substantial disadvantages, however, in that they are of a more or less complex structure, entailing considerable expense from the viewpoints of installation and operation, and furthermore serious accidents frequently result owing to the lack of proper safety equipment for temporarily sustaining the load, should the operating mechanism become defective while the vehicle is being tilted.

A primary aim of the present invention, therefore, is to overcome such deficiencies, and other objects and advantages will be so clearly apparent, as incidental to the following disclosure, that it would only be unnecessary repetition to further refer to them initially.

In the accomplishment of the desired ends, my particular improvements reside both in the unique manner of operatively supporting the actuated platform section *per se* and in conjunction with coöperating safety mechanism novelly combined therewith.

While, in specifying at least one important field of usefulness, it may be said that the invention has been primarily devised as an improvement over the well known form of platform dumps employed at wheat or other grain elevator stations, still it is desirable to state at the outset that the use of the improvements is not necessarily limited to any such single industry, as the invention is equally adapted for installation in many other analogous relations, such as in sugar beet hauling or in fact wherever any other commodity is conveyed in bulk by land vehicles for unloading at a centralized station.

With these prefacing remarks, and for a clearer understanding of the essentials of the invention as particularly set forth in the appended claims, reference will now be had to the accompanying drawings, illustrating the details of the improvements, in which drawings like reference numerals designate the same parts in the several views, of which latter—

Figure 1 is a side elevational view, showing my improved means for operatively supporting the elevating platform section and the safety equipment therefor, the view being local to the improvements as dissociated with the main dump structure, and being partly broken away and partly in section for clearness of illustration;

Fig. 2 is a local cross-sectional view taken on the line 2—2 of Fig. 1;

Fig. 3 is a fragmentary end face elevational view of the rack and pawl safety equipment arrangement;

Fig. 4 is a local cross-sectional view taken on the line 4—4 of Fig. 1; and

Fig. 5 is a fragmentary top plan view, illustrating the general association of elements, and more particularly the safety equipment's disposition with the brace bars for its depending racks, but omitting the divergent arms supporting the platform section.

Although the platform section and rack supporting bars, hereinafter referred to, might and ordinarily would be constructed of wood, all of the other parts of the improvements are formed of metal, for fireproof and other obvious purposes.

10 designates a foundation of concrete or the like, on which is mounted a base support having a flat bed 11, a central enlarged portion 12 and integral reinforcing webs 13, the enlarged portion providing an annular threaded recess or chamber 14, with an operating pressure fluid inlet and outlet bore 15 communicating therewith, and this base casting is firmly secured to the concrete foundation as by bolt and nut elements 16.

The threaded recess 14 receives the threaded lower end of a piston barrel 17, which latter serves the additional important function of a centering and guiding standard, as associated with other parts, for the vertically actuated platform section.

Where the bore 15 communicates laterally with the chamber 14, as shown, although obviously it could enter directly from the bottom, the lower end of the barrel or piston cylinder 17 is suitably apertured, as at 18, to register with said bore when screwed home.

The upper end of the barrel is preferably provided with an external collar 19, secured by set screws 20, or an equivalent stop element, for limiting the upward movement of the parts, as will be hereinafter referred to.

21 is a plunger operating support, freely reciprocating in the barrel 17, and the lower end of which carries a piston head 22, provided with the usual piston packing rings.

The upper end of the operating plunger support 21 may be provided with an external stop collar 23, if desired, to limit the downward movement of the plunger and thus prevent the piston head from covering the aperture 18.

The upper extremity of the plunger support 21 seats the vertically movable platform section 24 from a centrally balanced position, it being understood that this movable platform section is associated with an encompassing stationary main platform, which as a rule in wheat dumps has a trap door over a hopper discharging to a pit from which the grain is elevated to the storage point by means of an endless conveyer.

The platform section 24 need not be fixedly carried by the plunger element 21, but as shown it may simply be detachably supported thereon, and it may be desirable to provide an interposed metallic plate 25 bolted to the central bottom face of the platform section, preventing undue wear on the latter by the elevating plunger element.

26 designates an open-ended sleeve support, of comparatively short length, which freely encompasses the barrel standard 17, and which may be cast to provide a plurality of elongated securing lugs 27, exteriorly projected radially of the sleeve.

To the side faces of each of these elongated lugs 27 are suitably secured the lower ends of paired arms 28 (omitted from Fig. 5) the arms of each pair being upwardly divergent with reference to each other, while collectively they are disposed at angles to flare upwardly and outwardly, analogous to an inverted truncated skeleton cone, and the upper ends thereof are suitably secured to the platform section 24 at positions contiguous its side and end edges, whereby the sleeve support 26 is suspended centrally below the movable platform section and provides a centralized guiding and centering means therefor, instead of otherwise requiring a plurality of corner end and side guide standards.

In actual practice it is also preferable to provide the sleeve support 26 with anti-friction roller elements, and to this end the sleeve may be cast with upper and lower pairs of short longitudinal slots 30, with contiguous spaced ear lugs 29 radially disposed outwardly of the sleeve, intermediate of said elongated lugs 27, which ear lugs 29 journal transverse axis pins 31 carrying the anti-friction rollers 32, the latter slightly protruding through said slots 30 to engage the barrel 26 in rolling contact.

33 is simply a bored nipple providing communication between the bore 15 and a pressure fluid pipe line 34, connected with a supply source of operating pressure fluid, which conduit may be under control of a two-way valve (not shown) whereby the bore 15 will suffice both as the inlet for the operating pressure fluid and as the relief outlet or exhaust during the downward movement of the piston-plunger element.

A pair of rack bar supports 35, substantially longer than the piston-plunger element, are secured to said movable platform section and depend from one side face thereof, which depending supports are faced with the ratchet or toothed bars 36 and are rigidly braced by the strut bars 37 extending between the arms 28 and the supports, as in Fig. 1, or they might be connected at their inner ends with the elongated lugs 27, as would be inferred from Fig. 5.

Coöperating with said rack bars are a pair of pawls 40, secured to a transverse rock shaft 38 journaled as at 39 on a pair of standards at a position toward the upper end of the barrel 17, and 41 is a short lever arm also secured to the rock shaft at a suitable position, which lever arm may be connected to a retractile foot lever 42, as by a rod 43 or otherwise, but other suitable mechanism might be employed for conjointly disengaging the pawls from the rack bars, to permit of the descent of the movable platform element, when properly operated.

*Operation.*

Assuming that the parts are in the position shown at Fig. 1, with the movable platform section 24 lying flush with the immovable section, and that a loaded vehicle is properly positioned thereover, with its forward wheels resting on the movable section and its rear wheels on the stationary section, then upon cutting the operating pressure fluid into the pipe line 34 the same will rush into the lower end of the piston barrel 17 underneath the piston head, causing the plunger support to gradually rise and thus elevate the platform section 24 which is centrally supported thereby. Obviously, therefore, the vehicle will be correspondingly tilted for dumping its contents, but it is to be understood that I make no claim to this broad feature alone.

However, the platform section 24 is solely supported at its central position by the plunger support 21, and, by my improvements, its balance will be maintained and the stress of the load distributed by the trussing effect, as it were, of the equalizing stress arms 28 in conjunction with the sliding central sleeve support 26, to which they are connected at diametrically opposite positions at their convergent lower ends. Thus the mounting of the sleeve 26, as a centrally supported sliding unit, in conjunction with its upwardly radiating arms 28 attain the threefold aim of centering, guiding and stress equalizing means for the movable platform section, while of course the co-action of the rollers 32 serve as friction reducing means.

During this upward movement, the rack bars 36 are likewise elevated, with the pawls 40 trailing over the teeth thereof, and the importance of this automatically operating safety mechanism cannot be overestimated, in the emergency of the elevating power becoming deficient, either when the platform is fully raised or during the time of its elevation, the heavy load being thus sustained indefinitely in avoidance of its being otherwise dropped suddenly with a likelihood of serious injury to operatives. To release the pawls from engagement with the rack bars, either under normal or abnormal operations, the platform would probably have to be further slightly raised, when pressure upon the foot lever 42 would rock the shaft 38 and throw both pawls temporarily out of the path of the rack bars, when the air control valve (not shown) is operated to cut off the pressure fluid and open the exhaust conduit from the piston barrel, through the conduit 15—34, permitting the platform with its vehicle to descend gradually owing to the cushioning effect of the exhausting spent pressure fluid.

The adjustable collar 19 will serve as a limiting stop to the upward movement of the parts by being engaged by the upper edge face of the sleeve 26, and likewise the collar 23 will limit the downward movement of the piston-plunger support, it being noted that the plunger support is not connected with the movable platform section.

It may finally be said that the foregoing functioning will be substantially the same with vehicles dumping from the side (if such be in use) instead of at the rear end, although in the former case both forward and rear wheels on the side of the vehicle's elevation would have to be positioned on the vertically movable platform section, and obviously in employing the term vehicle I mean any type of vehicle body, whether hauled or motor driven, wheeled or otherwise, and even heavy railway cars could be dumped in the same fashion, provided the rails are properly laid and separated with reference to the stationary and movable platform sections.

Again, while I conceive now that the piston-plunger arrangement with its pressure fluid control may be the most practical form of elevating means, still in so far at least as some of the salient features of my improvements are concerned, it may not be at all impractical to operate the plunger support by other means than that of pressure fluid.

Therefore, while I have thus made a complete disclosure of a practical embodiment of my improvements, it may later be found to be desirable or expedient to make alterations or substitution in the form and structural arrangement of the elements, but without departing from the spirit of the invention, and it is to be understood that I do not wish to unnecessarily limit myself to the exact details shown and described, excepting as they may come within the purview of the ensuing claims, contemplating a fair interpretation thereof in the light of the specification, if necessary, and understood equivalents.

What I do claim, as new and patentable, is:—

1. In dumping apparatus of the character set forth, the combination of a fixed standard, an elongated support longitudinally slidable therealong, a platform section mounted upon the upper end of said elongated support, elevating means therefor, and unitary means for centering and guiding said platform section, comprising a hollow member encompassing said standard and elongated support and centrally suspended from said platform section by suitable rigid supporting means, substantially as described.

2. In dumping apparatus of the character set forth, the combination of a fixed standard, an elongated support longitudinally slidable therealong, a platform section mounted upon the upper end of said elongated support, elevating means therefor, and unitary means for centering and guiding said platform section, comprising a hollow member encompassing said standard and elongated support and centrally suspended from said platform section by a rigid inverted skeleton cone-like structure, substantially as described.

3. In dumping apparatus of the character set forth, the combination of a fixed hollow standard, an elongated support longitudinally operating therein, a platform section mounted upon the upper end of said elongated support, elevating means therefor, and unitary means for centering and guiding said platform section, comprising a hollow member slidingly encompassing said hollow standard and centrally suspended from said platform section by suitable rigid connections therebetween, substantially as described.

4. In dumping apparatus of the character set forth, the combination of a fixed hollow standard, an elongated support longitudinally operating therein, a platform section mounted upon the upper end of said elongated support, elevating means therefor, and unitary means for centering and guiding said platform section, comprising a hollow member slidingly encompassing said hollow standard and centrally suspended from said platform section by a rigid inverted skeleton cone-like structure, substantially as described.

5. In dumping apparatus of the character set forth, the combination of a fixed hollow standard, an elongated support longitudinally operating therein, a platform section mounted upon the upper end of said elongated support, elevating means therefor, and unitary means for centering and guiding said platform section, comprising a hollow member freely encompassing said hollow standard and centrally suspended from said platform section by suitable rigid connections therebetween, the said hollow member mounting anti-friction rollers operating through slots therein to contact with said hollow standard, substantially as described.

6. In dumping apparatus of the character set forth, the combination of a fixed hollow standard, providing controlled means toward its lower end for supplying and exhausting a pressure fluid, a piston-plunger longitudinally operating therein, a platform section mounted upon the upper end of said plunger, and unitary means for centering and guiding said platform section, comprising a hollow member slidingly encompassing said hollow standard and centrally suspended from said platform section by suitable rigid connections therebetween, substantially as described.

7. In dumping apparatus of the character set forth, the combination of a fixed hollow standard, providing controlled means toward its lower end for supplying and exhausting a pressure fluid, a piston-plunger longitudinally operating therein, a platform section mounted upon the upper end of said plunger, and unitary means for centering and guiding said platform section, comprising a hollow member slidingly encompassing said hollow standard and centrally suspended from said platform section by a rigid inverted skeleton cone-like structure, substantially as described.

8. In dumping apparatus of the character set forth, the combination of a cylinder barrel disposed in fixed vertical position and providing controlled means toward its lower end for supplying and exhausting a pressure fluid, a piston plunger longitudinally operating therein, a platform section mounted upon the upper end of said plunger, and unitary means for centering and guiding said platform section, comprising a sleeve freely encompassing said fixed barrel and centrally suspended from said platform section by suitable rigid connections therebetween, the said sleeve mounting a plurality of pairs of upper and lower anti-friction rollers operating through slots therein to contact with said barrel, substantially as described.

9. In dumping apparatus of the character set forth, the combination of a fixed standard, an elongated support longitudinally slidable therealong, a platform section mounted upon the upper end of said elongated support, elevating means therefor, unitary means for centering and guiding said platform section, comprising a hollow member encompassing said standard and elongated support and centrally suspended from said platform section by suitable rigid supporting means, safety mechanism automatically coacting with said platform section to maintain the latter at any elevated position until released, and releasing means for said safety mechanism, substantially as described.

10. In dumping apparatus of the character set forth, the combination of a fixed standard, an elongated support longitudinally slidable therealong, a platform section mounted upon the upper end of said elongated support, elevating means therefor, unitary means for centering and guiding said platform section, comprising a hollow member encompassing said standard and elongated support and centrally suspended from said platform section by suitable rigid supporting means, a pair of rack bars suspended from said platform section, a transversely disposed rock shaft located toward the top of said fixed standard and mounting pawls normally engaging said rack bars, and means for rocking said shaft to release said pawls from engagement with said rack bars, substantially as described.

In testimony whereof, I affix my signature.

AUGUST P. KEZEMA.